United States Patent
Zöhrer et al.

(10) Patent No.: US 7,661,495 B2
(45) Date of Patent: Feb. 16, 2010

(54) DRIVE UNIT FOR MOTOR VEHICLES WITH HYBRID DRIVE IN A LONGITUDINAL ARRANGEMENT

(75) Inventors: Franz Zöhrer, Knappenberg (AT); Konstantin Erjawetz, Graz (AT); Peter Pichler, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 407 days.

(21) Appl. No.: 11/576,058

(22) PCT Filed: Sep. 27, 2005

(86) PCT No.: PCT/AT2005/000388

§ 371 (c)(1),
(2), (4) Date: Jun. 25, 2007

(87) PCT Pub. No.: WO2006/034520

PCT Pub. Date: Apr. 6, 2006

(65) Prior Publication Data

US 2009/0200094 A1 Aug. 13, 2009

(30) Foreign Application Priority Data

Sep. 27, 2004 (AT) ............................ GM698/2004

(51) Int. Cl.
*B60K 6/42* (2007.10)
(52) U.S. Cl. .............. 180/65.22; 180/65.23; 180/65.24; 180/65.25; 180/65.6; 180/65.7; 903/909; 903/910; 903/911; 903/912; 903/916

(58) Field of Classification Search ............... 180/65.2, 180/65.225, 65.23, 65.24, 65.25, 65.6, 65.7; 903/909, 910, 911, 912, 915, 916, 917
See application file for complete search history.

(56) References Cited

U.S. PATENT DOCUMENTS

| 1,853,058 | A | | 4/1932 | Johnson |
| 4,533,011 | A | | 8/1985 | Heidemeyer et al. |
| 5,419,406 | A | * | 5/1995 | Kawamoto et al. ......... 180/65.6 |
| 6,679,799 | B2 | * | 1/2004 | Bowen .......................... 475/5 |
| 6,881,168 | B2 | | 4/2005 | Bowen |
| 7,572,201 | B2 | * | 8/2009 | Supina et al. .................. 475/5 |
| 2007/0093341 | A1 | * | 4/2007 | Supina et al. .................. 475/5 |

FOREIGN PATENT DOCUMENTS

DE 199 19 455 11/2000

* cited by examiner

*Primary Examiner*—Paul N Dickson
*Assistant Examiner*—Bryan A Evans
(74) *Attorney, Agent, or Firm*—Bachman & LaPointe, P.C.

(57) ABSTRACT

A drive unit for motor vehicles with hybrid drive and a drive train in a longitudinal arrangement, between the internal combustion engine and the first axle, comprising a housing piece, a through driveshaft, an electric motor, surrounding the through driveshaft with a first clutch before the electric motor and a second clutch thereafter, whereby a second axle is also to be driven with minimal space requirement. A first electric motor is thus physically combined with the first clutch, surrounding a second electric motor and the through driveshaft and is connected to the second axle by means of a third clutch, an offset gear and a shaft.

9 Claims, 3 Drawing Sheets

DRIVE UNIT FOR MOTOR VEHICLES WITH HYBRID DRIVE IN A LONGITUDINAL ARRANGEMENT

BACKGROUND OF THE INVENTION

The invention relates to a drive unit for a motor vehicle with a hybrid drive and a drive train in a longitudinal arrangement, which drive train also comprises an internal combustion engine, a longitudinal shaft for driving a first axle, and a gear mechanism, and which drive unit is arranged between the internal combustion engine and the first axle and comprises a housing part, a through-drive shaft, an electrical machine surrounding the through-drive shaft and a first clutch upstream of and a second clutch downstream of the electrical machine. With the longitudinal arrangement, the permanently driven, in this case the first, axle is generally the rear axle.

Such a drive train is known from DE 29 43 554 C2, but is only illustrated schematically. The rotation speed ratios and structural features are now shown. In any case the electrical machine is used both as a drive or an additional drive and as a starter and generator. A few more details, if only for a drive train having a transverse design, are given in EP 775 607 B1. Therein, the electrical machine has a relatively high rotation speed and is connected to the axle drive via a planetary gear mechanism, as is the internal combustion engine. The planetary gear mechanism is a superposition gear mechanism, in which the two drive torques are added to one another. This has the disadvantage that if only one of the two drives is working, the other needs to be blocked in order to provide a supporting torque. Furthermore, a purely electromotive drive for the second axle is added there. In order to accommodate such an additional drive on a rear axle, there is too little space there without altering the design. If, in the case of a drive train with a longitudinal design, the second driven axle is intended to be the front axle, it is not possible to solve this problem of space and it is also necessary to extensively alter the entire vehicle.

SUMMARY OF THE INVENTION

It is therefore the object of the invention, in the case of a vehicle with a drive train in a longitudinal arrangement, to provide an additional electrical drive for the second (generally the front) axle, incurring as few costs as possible and with as few changes as possible to the vehicle. The drive unit should also be capable of being used in modular fashion (i.e. in various configurations) and should manage with the space which, in conventional all-wheel drive vehicles, is available for a transfer case. It should therefore also not be any longer.

According to the invention, this is achieved by virtue of the fact that a first electrical machine is structurally combined with the first clutch, and that, for driving a second axle, the drive unit comprises a second electrical machine, which surrounds the through-drive shaft, and is drive-connected to a shaft leading to the second driven axle via a third clutch and an offset drive. The installation length is therefore only determined by the two directly adjacent electrical machines, especially if the second electrical machine is also structurally combined with the third clutch, with the result that, together with the offset drive, the contour of a transfer case can be seen. Furthermore, no changes to the vehicle are required, since the drive train connected to the drive unit is conventional.

It is advantageous if the clutch is arranged within the electrical machine, since the electrical machines can thus be designed to have a rotation speed which is appropriate for the engine rotation speed and, owing to the larger radius of the rotor, can be designed to be very narrow.

In one development of the invention, the first electrical machine and the second electrical machine are each accommodated by a housing comprising a cylindrical casing and an axially normal wall, and the cylindrical casings are screwed to one another. The preconditions for a modular use are therefore provided, and the assembly of the two coaxial modules is simplified and the installation length further shortened.

If the electrical machine comprises a stator fixed in the housing and a rotor, and if the clutch in each case is a multi-plate clutch comprising an inner part and an outer part, in a further continuation of the concept of the invention, both the first and the second rotor are mounted in a bearing on the axially normal wall of the housing and have a replaceable coupling disk, which is connected to the clutch outer part such that it is fixed against rotation, the clutch being arranged between the bearing and the coupling disk. The replaceable coupling disk makes it possible to use identical rotors for both electrical machines; they are matched to their installation situation by fitting the respectively suitable coupling disk.

In one particularly advantageous embodiment, the inner part of the first clutch rests on a first shaft, which is drive-connected to the internal combustion engine, and the outer part of the first clutch is connected to a second shaft (which represents the through-drive shaft) such that it is fixed against rotation, which shaft passes through the second electrical machine and leads to the second clutch; and the inner part of the second clutch is connected to a primary wheel of the offset drive such that it is fixed against rotation via a hollow shaft, and the outer part of the second clutch is connected to the coupling disk of the second electrical machine such that it is fixed against rotation. The drive unit is therefore completely modularized; the unit with the first electrical machine is the first module and the unit with the second electrical machine is the second module. It is thus possible, for example, for the first module to be used on its own if a hybrid vehicle is to be equipped with only one driven axle.

Advantageous developments consist in the fact that an actuator cylinder, which contains an annular piston, for the clutch is fixed to the axially normal wall, and the annular piston interacts with a contact-pressure plate of the clutch via a thrust bearing and that the first and/or the second electrical machine each have a rotation speed sensor, which is fixed to the axially normal wall, and a rotation speed transmitter collar is fitted to the rotor. The former makes it possible to actuate the clutches without a rotary input to a rotating part, and the latter makes control possible in which the meshing of a clutch is dependent on the rotation speed ratios.

BRIEF DESCRIPTION OF THE DRAWINGS

In the text which follows, the invention will be described and explained with reference to drawings, in which.

DETAILED DESCRIPTION

Figure 1:
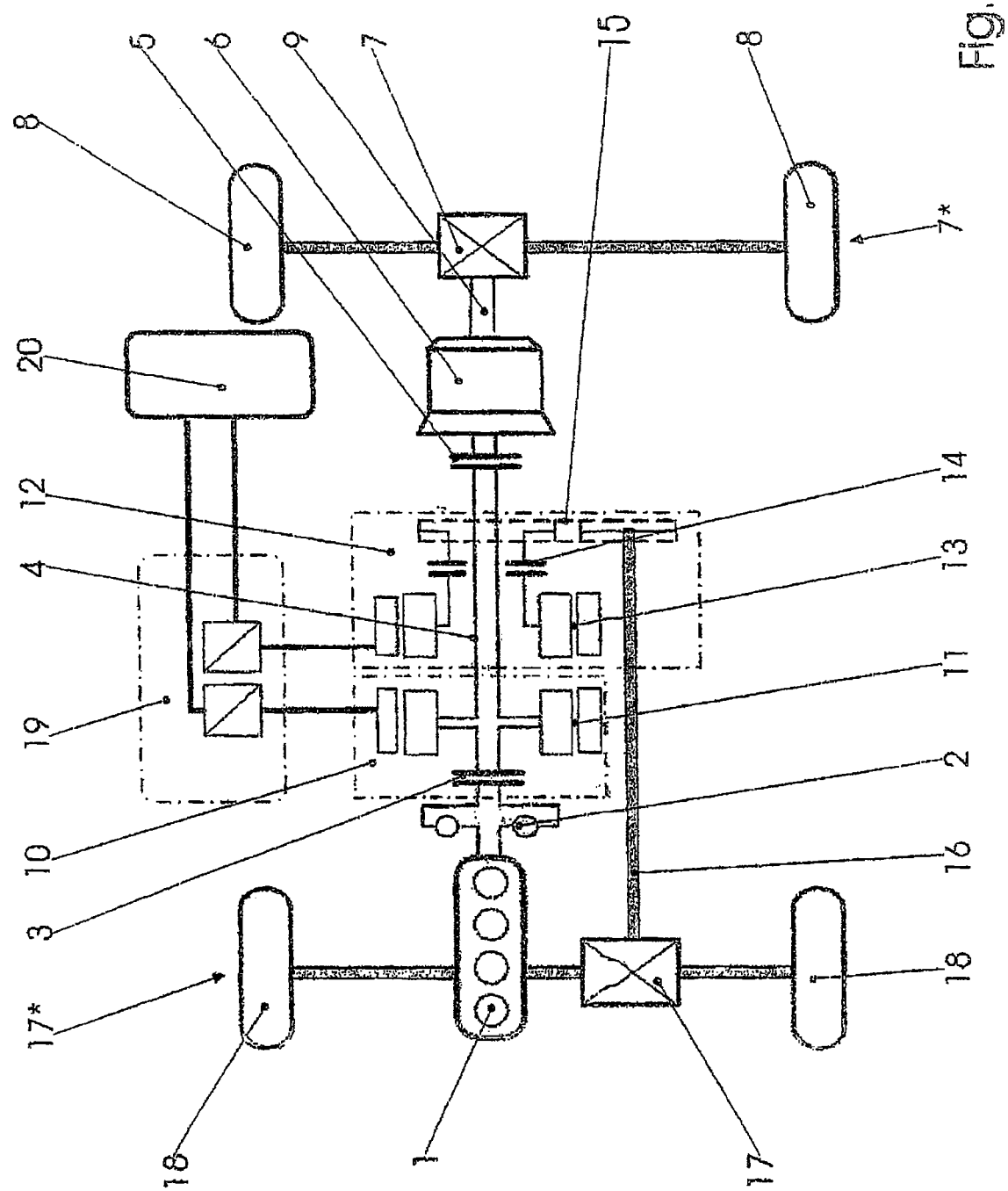
FIG. 1 shows a schematic of a drive train with the drive unit according to the invention.

In FIG. 1, the internal combustion engine of a motor vehicle is denoted by 1. It is connected to a through-drive shaft 4 via an oscillation damper 2, possibly on a flywheel, and a first clutch 3. This through-drive shaft 4 drives a first driven axle 7*, in this case its axle gear mechanism 7 and therefore, in the exemplary embodiment shown, the rear wheels 8, via a second clutch 5 and a shift transmission 6.

The drive unit according to the invention comprises a first module 10 and a second module 12 directly adjacent thereto. A first electrical machine 11 is located in the first module 10, and a second electrical machine 13 is located in the second module 12. The second electrical machine 13 drives a propeller shaft 16 via a third clutch 14 and an offset drive 15, which propeller shaft 16 leads to the second driven axle 17*, and therefore to the front wheels 18 via an axle gear mechanism 17. In order to control the two electrical machines 11, 13, power electronics 19 are provided which are connected to an energy store 20, for example a rechargeable battery.

Figure 2:
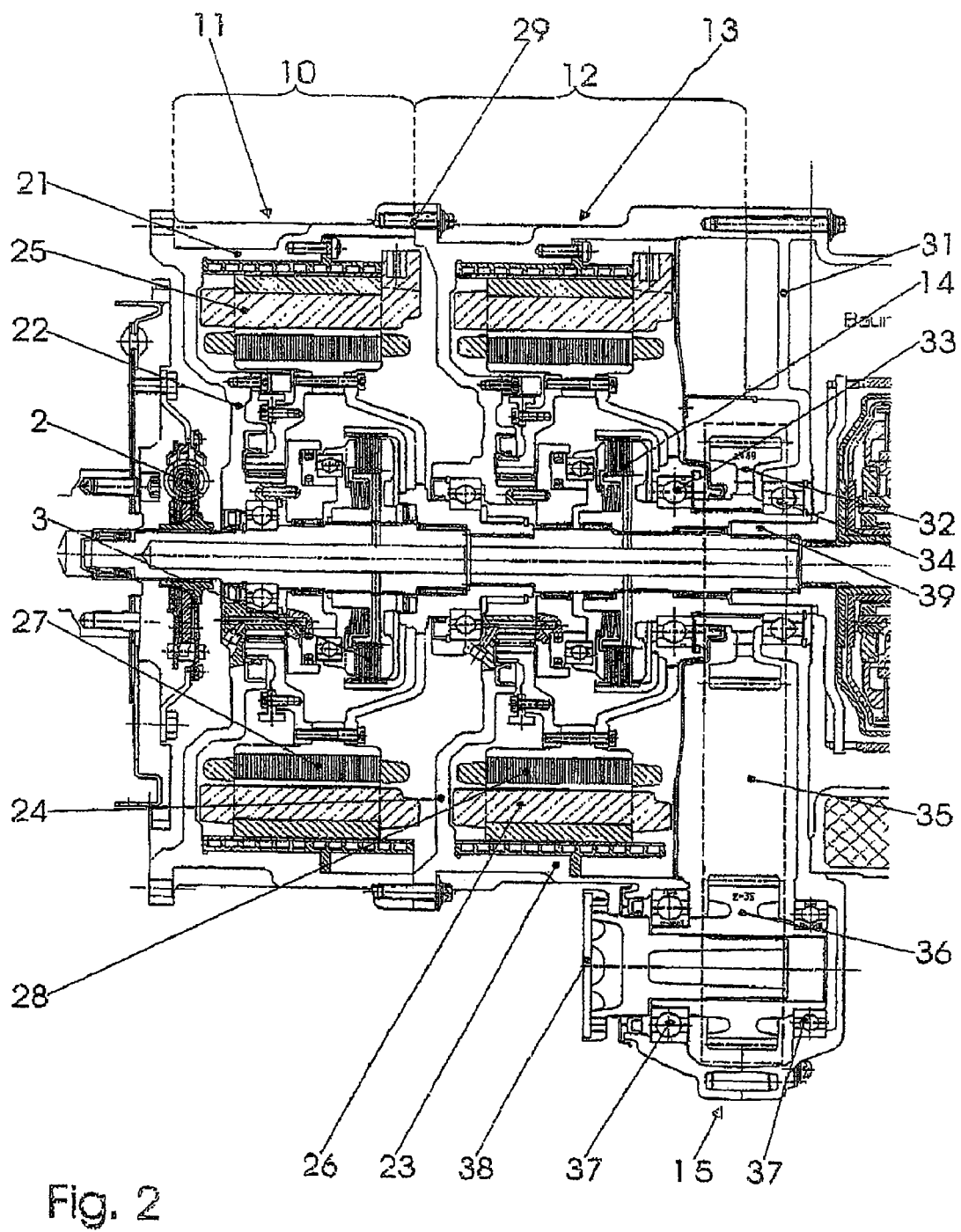
FIG. 2 shows the drive unit according to the invention in longitudinal section.

In FIG. 2, the drive unit comprises the two modules 10, 12. The housing of the first module comprises a cylindrical casing 21 and an axially normal wall 22, and the housing of the second module 12 comprises a cylindrical casing 23 and an axially normal wall 24. A first stator winding 25 of the first electrical machine 11 is fixed in the casing 21, and a second stator winding 26 of the second electrical machine 13 is fixed in the casing 23. The rotors of these machines are denoted by 27 and 28. The two casings 21, 23 of the two modules 10, 12 are screwed to one another to form a common housing by means of a number of bolts 29.

The casing 23 of the second module 12 is adjoined by a housing cover 31, which contains the offset drive 15. This offset drive 15 comprises a primary gear wheel 32, which can be driven by the second rotor 28 via the third clutch 14, and a secondary gear wheel 36, which is driven in this case via a toothed chain 35. Instead of the toothed chain, other traction mechanisms or intermediate gear wheels could also be provided. Bearings 33, 34 are provided on both sides of the primary gear wheel 32. The secondary gear wheel 37 is guided in bearings 37 and is connected to a flange 38 such that it is fixed against rotation, to which flange 38 the propeller shaft 16 is connected. An output drive flange 39, which is adjoined by the second clutch 5 (FIG. 1), is also provided coaxially with the primary gear wheel 32.

Figure 3:
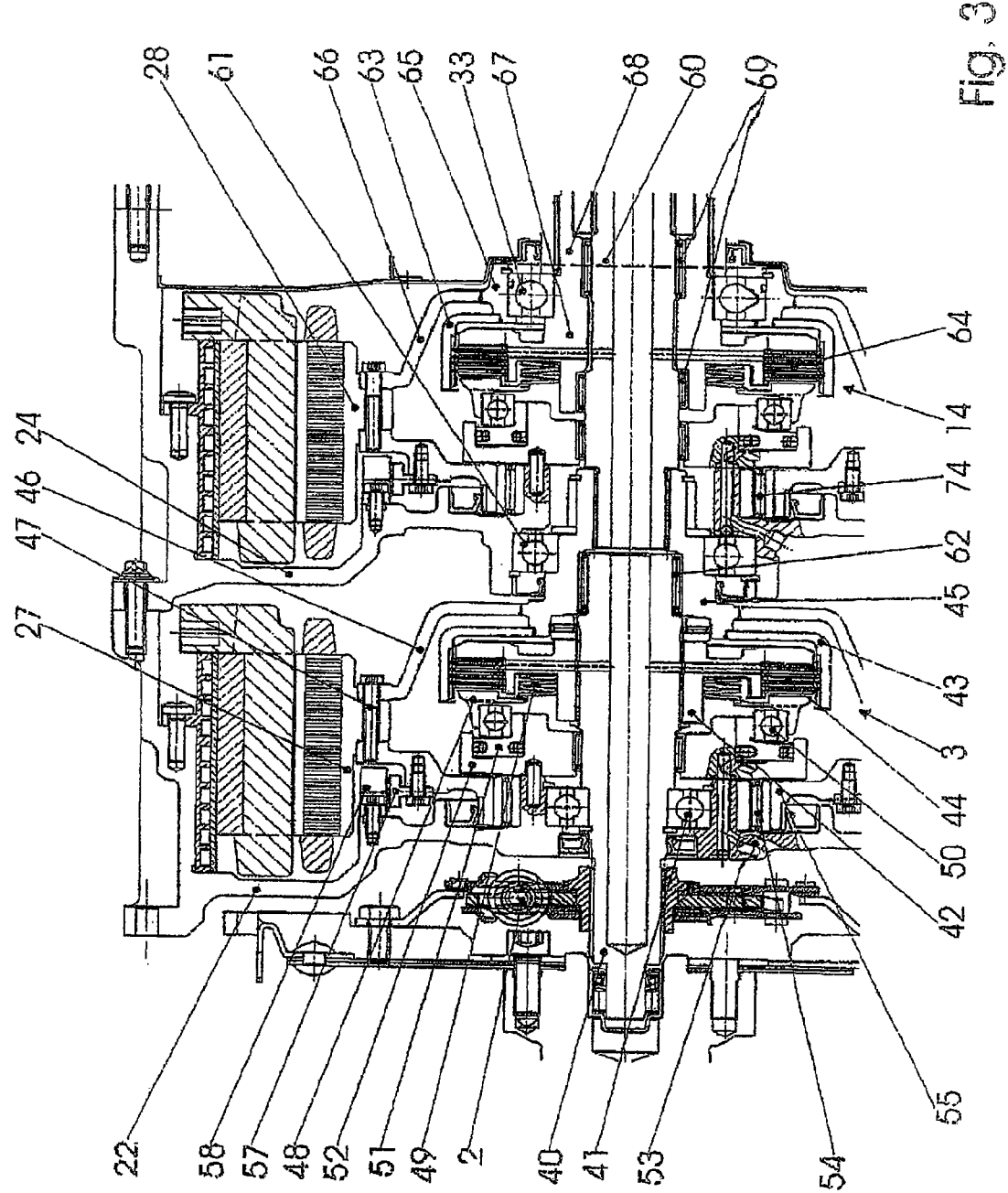
FIG. 3 shows a detail from FIG. 2.

With reference to FIG. 3, the content of the two modules 10, 12 will now be described in more detail. The first shaft 40, which is driven via the oscillation damper 2, is mounted firstly by means of a bearing 41 in the wall 22 of the housing. It is connected to an inner part 42 of the first clutch 3 such that it is fixed against rotation. Its outer part 43 is connected to a coupling piece 45 such that it is fixed against rotation, which coupling piece 45 contains a needle bearing 62, in which the other end of the first shaft 40 is mounted. A coupling disk 46 is likewise connected, in this case welded, to the coupling piece 45 such that it is fixed against rotation. The outer part 43 of the clutch, the coupling piece 45 and the coupling disk 46 therefore form a welded unit. The coupling disk 46 is fixedly connected to the first rotor 27 by means of bolts 47. As is yet to be shown, the two rotors 27, 28 have an identical design. They differ from one another only in terms of the shape of the coupling disks 46 which, because they are screwed on by means of the bolts 47, can be selected depending on the future use.

The first clutch 3 contains, in a known manner, a set of plates 44, on which and on whose plate springs 49 a pressure plate 48 acts. This pressure plate 48 is acted on by an actuator, which comprises an annular cylinder 52, which is fixed to the housing, and an annular piston 51, via a thrust bearing 50. Furthermore, an oil-feed hole 53 to the cylinder 52 and a needle bearing 54, in which a rotor disk 55 is mounted, are provided in the wall 22 of the housing. The first clutch 3 is therefore accommodated within the first rotor 27 and between the coupling disk 46 and the rotor disk 55. A rotation speed transmitter collar 57 with suitable teeth is fixed to the rotor disk 55 and interacts with a rotation speed sensor 58, which is fixed to the housing. The output signal of the rotation speed sensor 58 can be used by the control system in order to influence the meshing of the clutch as a function of the rotation speed difference present.

The second module 12 contains a second shaft 60, which is connected to the coupling piece 45 of the first module such that it is fixed against rotation and is mounted in various needle bearings 69, some in the housing and some in the second clutch 14. The third clutch 14 in the second module 12 again comprises an outer part 63 and an inner part 67 with a set of plates 64 therebetween. The outer part 63 is welded to a bearing ring 65, as is a coupling disk 66. Owing to the fact that the bearing ring 65 has a larger diameter than the coupling piece 45 of the first module 10, a different coupling disk 66 is used here, and the inner diameter of the outer part 63 of the clutch 3 is larger. The rotor 28 of the second electrical machine 13 differs from that of the first electrical machine 11 merely by the other coupling disk 66 which has been screwed on. The inner part 67 of the second clutch 14 is mounted on the second shaft 60 in needle bearings 69 and extends into a hollow shaft 68 on which (see FIG. 2) the primary gear wheel 32 of the offset drive 15 rests such that it is fixed against rotation.

A more detailed description of the second module 12 is not required since the two modules are constructed with as large a number as possible of identical parts. Thus, for example, the needle bearing 74 of the second rotor 28 is identical to the needle bearing 54 of the first rotor 27. The differences merely consist in the various shafts and shaft connections of the inner parts 42, 67 and outer parts 43, 63 of the clutches and of the coupling piece 45 and of the bearing ring 65. Thanks to the modular design, it is also possible to use only the first module 10 on its own (for a vehicle with only one driven axle) or only the second module 12 on its own (for a vehicle with a conventional drive for one axle and an additional electrical drive for the second axle). Overall, the silhouette of the drive unit described is not any larger than that of a conventional transfer case.

The invention claimed is:

1. A drive unit for a motor vehicle with a hybrid drive and a drive train in a longitudinal arrangement, which drive train also comprises an internal combustion engine (1), a longitudinal shaft (9) for driving a first axle (7*), and a gear mechanism (6), and which drive unit is arranged between the internal combustion engine and the first axle and comprises a housing part, a through-drive shaft, a first and a second electrical machine surrounding the through-drive shaft and a first clutch upstream of and a second clutch (5) downstream of the electrical machine, characterized in that a first electrical machine (11) is structurally combined with the first clutch (3), and in that, for driving a second axle (17*), the drive unit comprises the second electrical machine (13), which surrounds the through-drive shaft (60), and is drive-connected to a shaft (16) leading to the second axle (17*) via a third clutch (14) and an offset drive (15).

2. The drive unit as claimed in claim 1, characterized in that the second electrical machine (13) is structurally combined with the third clutch (14).

3. The drive unit as claimed in claim 1 or 2, characterized in that the clutch (3; 14; 3, 14) is arranged within the electrical machine (11; 13; 11, 13).

4. The drive unit as claimed in claim 1, characterized in that the first electrical machine (11) and the second electrical machine (13) are each accommodated by a housing comprising a cylindrical casing (21, 23) and an axially normal wall (22, 24), and in that the cylindrical casings (21, 23) are screwed to one another.

5. The drive unit as claimed in claim 1, the electrical machine (11; 13) comprising a stator (25; 26) fixed in the housing and a rotor (27; 28), and the clutch (3; 14) in each case being a multi-plate clutch comprising an inner part (42; 67) and an outer part (43; 63), characterized in that the rotor (27; 28) is mounted in a bearing (54; 74) on the axially normal wall (22; 24) of the housing and has a replaceable coupling disk (46; 66), which is connected to the clutch outer part (43; 63) such that it is fixed against rotation, the clutch (3; 14) being arranged physically between the bearing (54; 74) and the coupling disk (46; 66).

6. The drive unit as claimed in claim 5, characterized in that, of the first clutch (3), the inner part (42) rests on a first shaft (40), which is drive-connected to the internal combustion engine (1), and in that the outer part (43) is connected to a second shaft (60) such that it is fixed against rotation, which second shaft (60) passes through the second electrical machine (13) and leads to the second clutch.

7. The drive unit as claimed in claim 5, characterized in that, of the third clutch (14), the inner part (67) is connected to a primary wheel (32) of the offset drive (15) such that it is fixed against rotation via a hollow shaft (68) and the outer part (43) is connected to the coupling disk (66) of the second electrical machine (13) such that it is fixed against rotation.

8. The drive unit as claimed in claim 4, characterized in that an actuator cylinder (52), which contains an annular piston (51), for the clutch (3; 14) is fixed to the axially normal wall (22; 24), and the annular piston (51) interacts with a contact-pressure plate (48) of the clutch (3; 14) via a thrust bearing (50).

9. The drive unit as claimed in claim 1, characterized in that the electrical machine (11; 13) has a rotation speed sensor (58), which is fixed to the axially normal wall (22; 24), and a rotation speed transmitter collar (57) is fitted to the rotor (55).

* * * * *